Figure 1:
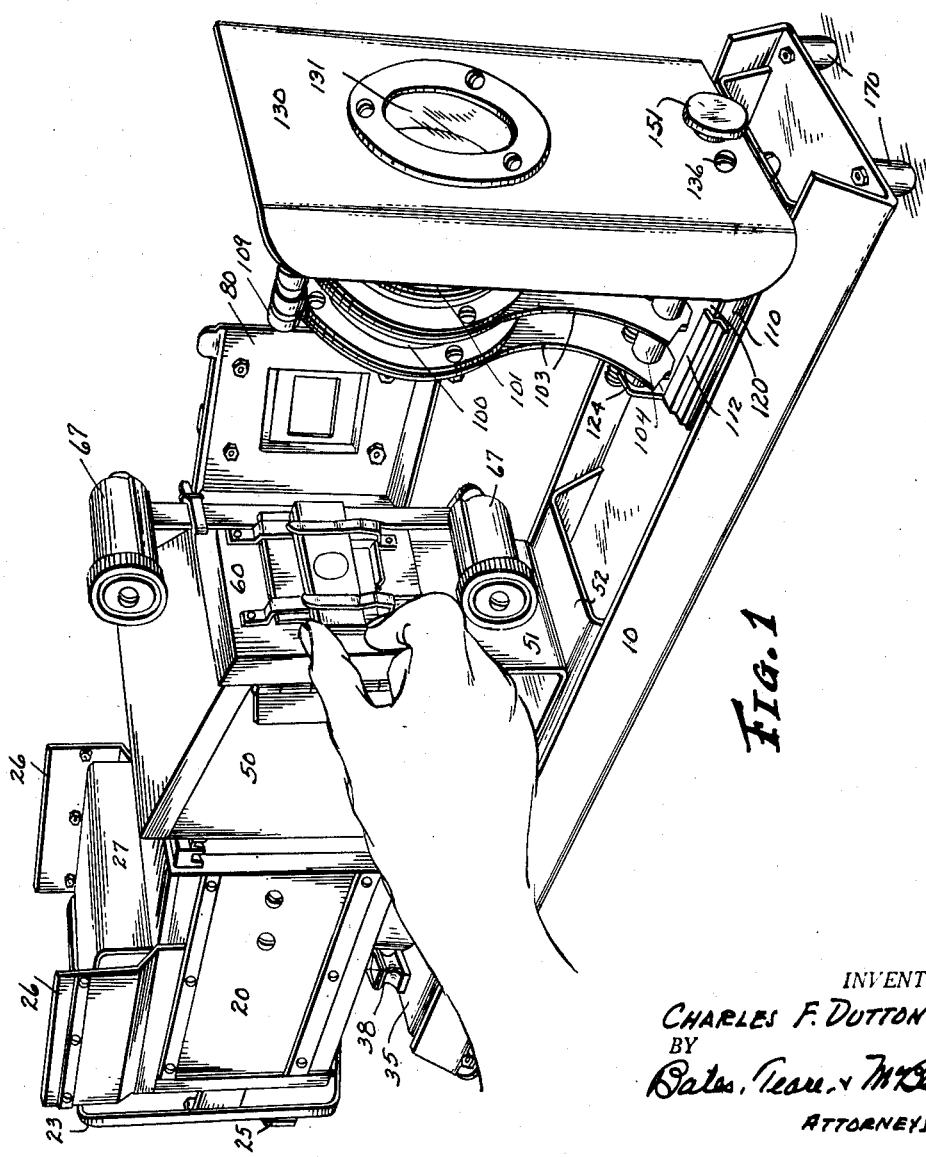

June 20, 1950  C. F. DUTTON  2,512,314
PROJECTING LANTERN HAVING INTERCHANGEABLE LENSES
Filed May 29, 1946  5 Sheets-Sheet 1

*INVENTOR.*
CHARLES F. DUTTON
BY
Bates, Teare & McBean
*ATTORNEYS*

June 20, 1950 C. F. DUTTON 2,512,314
PROJECTING LANTERN HAVING INTERCHANGEABLE LENSES
Filed May 29, 1946 5 Sheets-Sheet 2
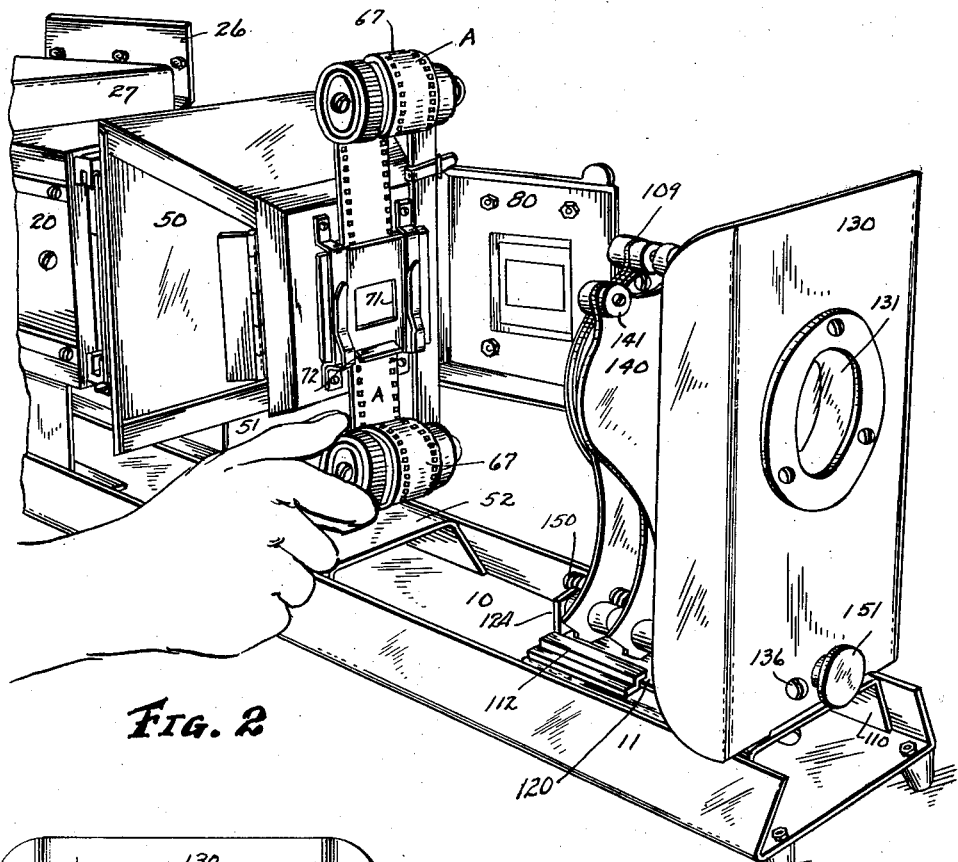
FIG. 2
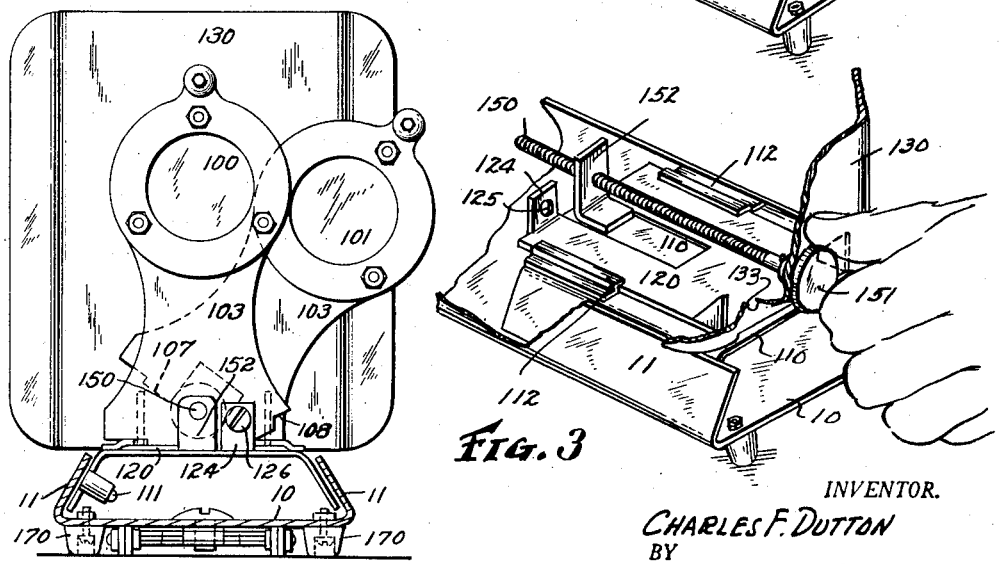
FIG. 7
FIG. 3
INVENTOR.
CHARLES F. DUTTON
BY
Bates, Teare, & McDean
ATTORNEYS June 20, 1950

C. F. DUTTON 2,512,314

PROJECTING LANTERN HAVING INTERCHANGEABLE LENSES

Filed May 29, 1946

5 Sheets-Sheet 3

INVENTOR.
CHARLES F. DUTTON
BY
Bates, Teare & McBean
ATTORNEYS

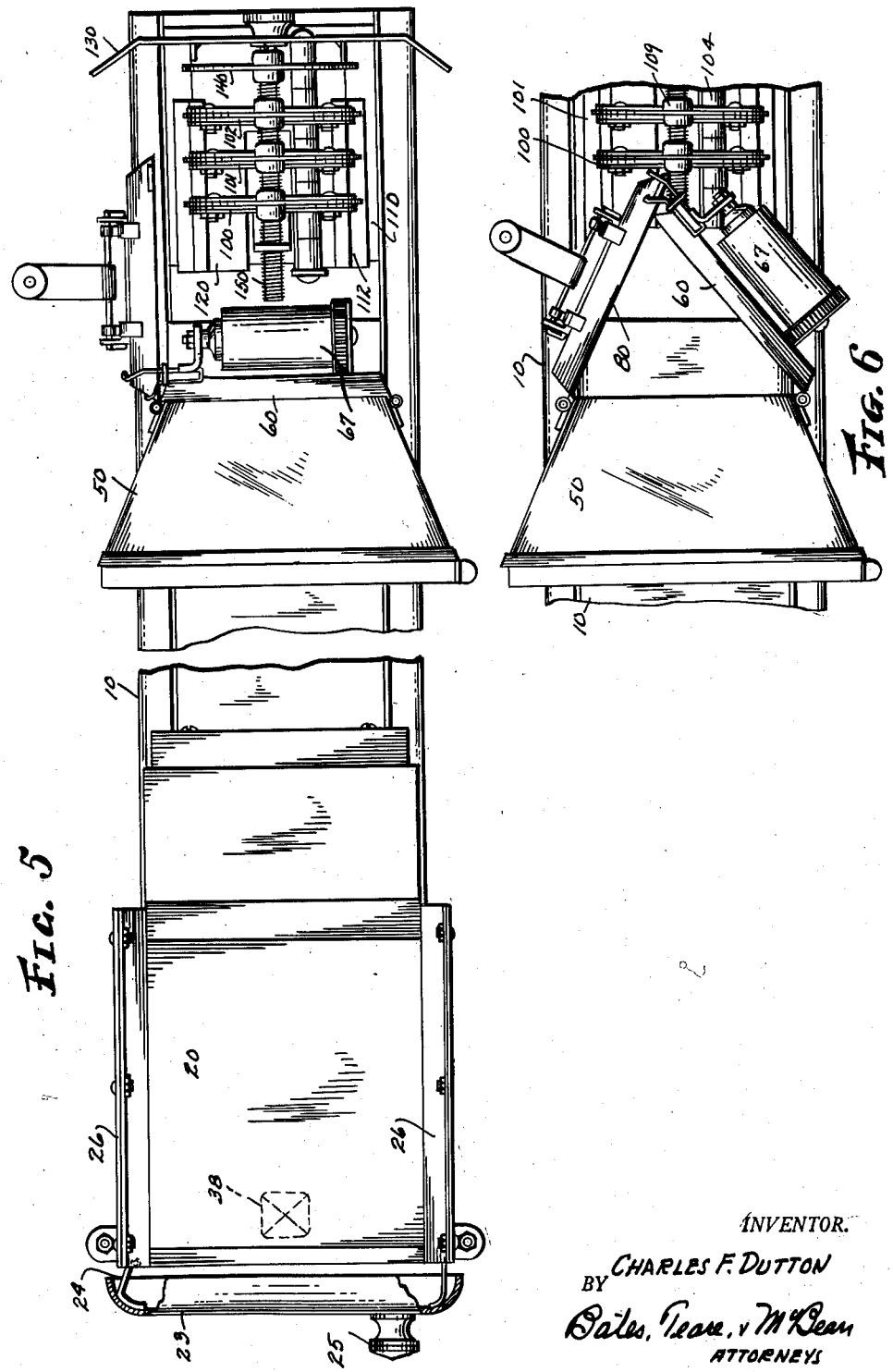

June 20, 1950 C. F. DUTTON 2,512,314
PROJECTING LANTERN HAVING INTERCHANGEABLE LENSES
Filed May 29, 1946 5 Sheets-Sheet 5

INVENTOR.
CHARLES F. DUTTON
BY
Bates, Teare & McBean
ATTORNEYS

Patented June 20, 1950

2,512,314

UNITED STATES PATENT OFFICE 2,512,314

PROJECTING LANTERN HAVING INTERCHANGEABLE LENSES

Charles F. Dutton, Rocky River, Ohio

Application May 29, 1946, Serial No. 673,025

2 Claims. (Cl. 88—26)

This invention relates to a lantern adapted to project images on a screen from a slide or film. Objects of the invention are to provide a lantern of such character that it may be economically manufactured, and to provide a system of interchangeable lenses which may be readily positioned selectively for different lenses or for a plurality of lenses operating together.

Other objects of the invention will become apparent from the following description of a preferred embodiment illustrated in the drawings.

Figure 4:
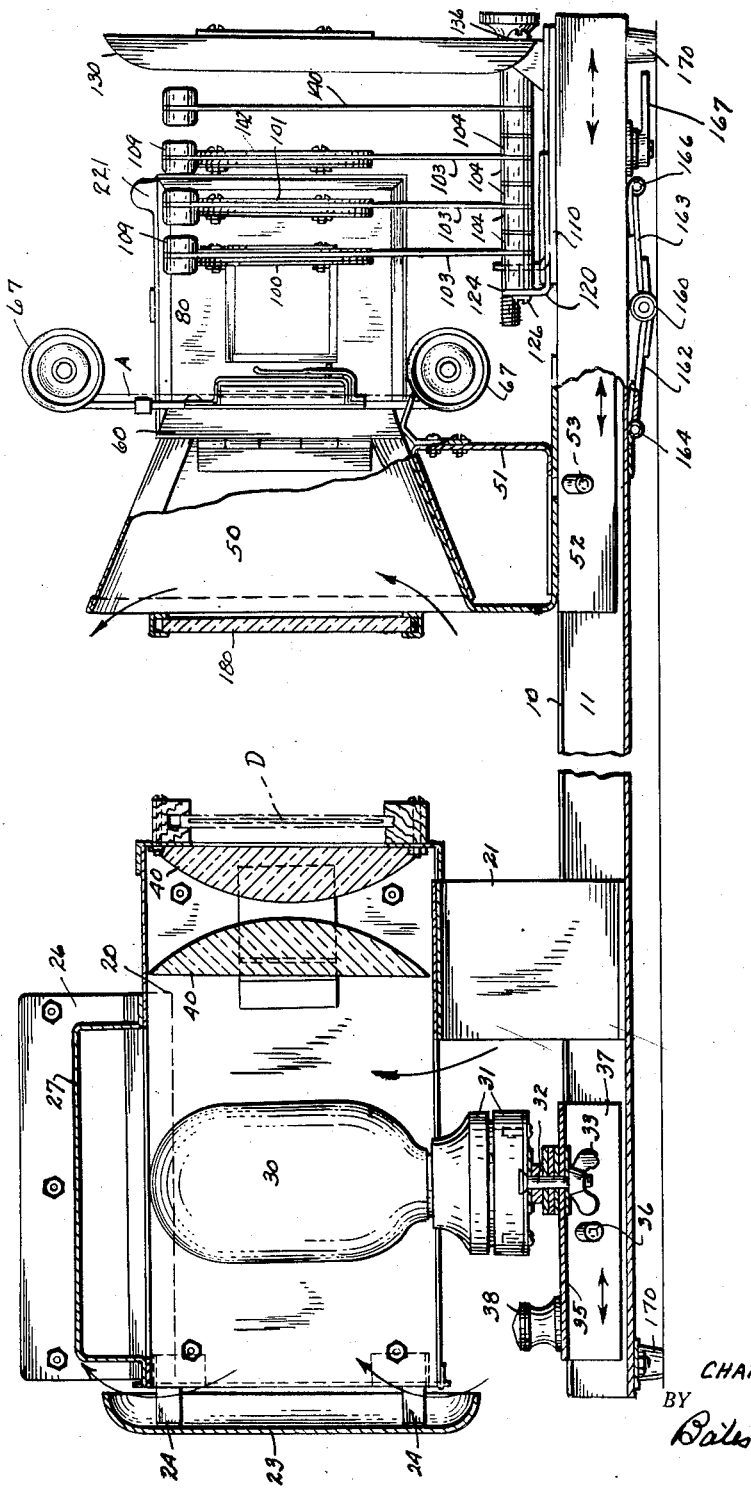
Figure 8:
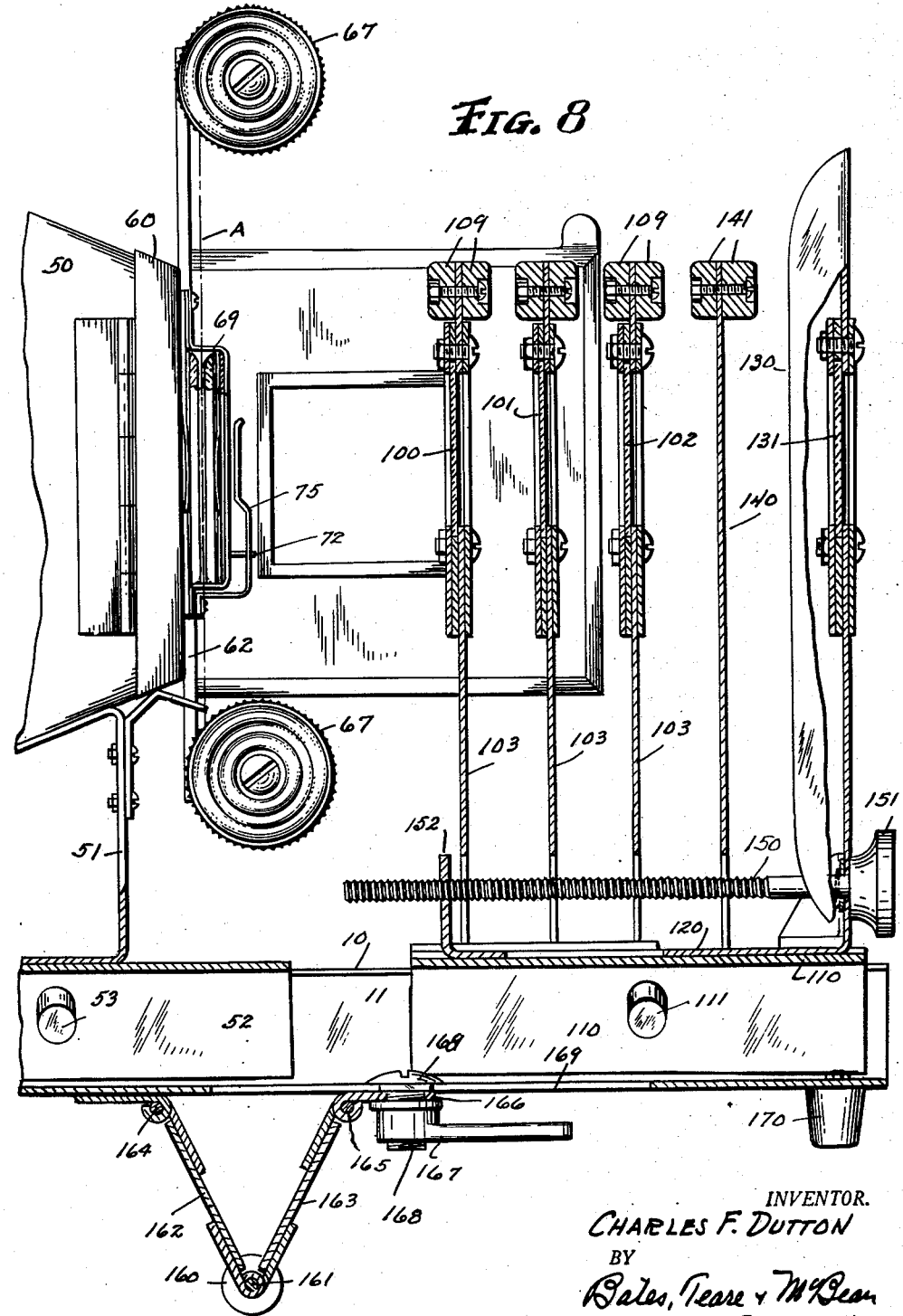

In the drawings, Fig. 1 is a perspective of my lantern showing it in position for use with a small slide; Fig. 2 is a perspective of the lantern with the film in position; Fig. 3 is a perspective, partly broken away, of the means for adjusting the lens carrier; Fig. 4 is a longitudinal vertical section through the lantern, partly broken away, in an intermediate region; Fig. 5 is a plan similarly broken away of the lantern; Fig. 6 is a plan of a portion of the lantern with the film and slide carriers in storage position; Fig. 7 is a vertical cross section through the lantern behind the interchangeable lenses looking toward the front, and Fig. 8 is a vertical section on a larger scale than the preceding views through the settable lenses in forward portion of the apparatus.

As shown more particularly in Figs. 1, 4 and 5, my lantern comprises briefly a base 10, a lamp housing 20 mounted on the base adjacent the rear end thereof and carrying the illuminating lamp 30 and the condensing lenses 40; a housing 50 mounted in an intermediate position on the base and having hinged to its front a pair of doors 60 and 80 for carrying slides and film respectively; then in front of the image carrier is a series of lenses 100 etc. pivotally mounted on a suitable slide 120 which also supports a front shield 130 carrying the object lens 131. The lamp, transparency carried and lens carriers are all slidably mounted on the base, so that they may readily be adjusted for proper focusing.

The lamp housing above referred to is best shown in Figs. 1, 4 and 5. It comprises a rectangular box supported by a bracket 21 secured to the base of the frame 10. The box has an open bottom extending from the rear end thereof to provide for the installation of the lamp 30. At the rear, the box is provided with a door 23 hinged to the box at 24 provided with a knob 25 by which it may be readily opened and closed. The top of the box is open, and above the open portion is a channel-shaped hood 27 open at its ends above the side walls of the box. Beyond these open ends are deflector plates 26 carried by the box. This provides for ample ventilation in a constantly upward direction about the lamp through the open space at the bottom of the box and thence into the hood and thence upwardly between the deflector plates, as indicated by the curved arrows on Fig. 5.

The lamp 30 is mounted in a suitable socket 31 which is secured by a clamping bolt 32 and wing nut 33 to a slide 35. This slide has outwardly and downwardly flaring side wings which rest within the inwardly diverted side flanges 11 of the base. Suitable friction means is provided between the slide 35 and the base as, for instance, the spring-pressed plunger 36 mounted in one of the flanges 37 of the slide and frictionally pressing against the inner face of the adjacent base flange 11. The slide is provided with an upwardly extending knob 38 by which the operator may readily adjust the position of the lamp longitudinally of the base.

The condensing lenses 40 are suitably carried within the housing 20 adjacent the forward end thereof and behind an inwardly extending marginal portion 28 of the housing.

The image carrier 50 is a frusto-pyramidal shaped box opened at its front and rear and carried by a downwardly extending bracket 51 which is mounted on a slide 52 having outwardly flanged edge portions extending into the base channel, one of which edge portions carries a spring pressed plunger 53 to frictionally engage the corresponding flange of the base.

The transparencies to be projected are carried by one or the other of a pair of doors 60 and 80, respectively, hinged to opposite edges of the front of the box 50. Either of these doors may be swung into position transversely of the box where it is held by a suitable spring retainer 55 (Fig. 4) carried by the bracket 51 and engaging the bottom of the door. Figs. 1 and 2 show the door 60 closed, while the other door 80 stands in idle position out of the path of the rays of projection of the lantern.

The door 60 carries a device for holding a spool or reel 67 of film which passes upward in front of the path of light from the lamp housing and is rewound on a second spool 67. The other door 80 is designed to carry small slides. Either door may be swung to active positive as desired to bring their respective transparencies, namely the film, into the path of projected light as desired.

The present invention is particularly concerned with the provision of a series of independently mounted lenses which may be selectively positioned in the path of projected light from the transparencies, and in the particular arrangement and mounting of these lenses by means of which the manufacture and operation is simplified and which permits rapid adjustment and manipulation of the lenses for various transparencies.

As illustrated, the different objective lenses such as 100, 101, and 102, are each mounted in a plate-like carrier 103, which is pivotally carried by a suitable slide 110 having downwardly flaring edge flanges mounted within the converging flanges 11 at the base 10. The slide 110 is provided with the spring-pressed plunger 111 to engage the adjacent flange 11 of the base and provide sufficient friction to prevent inadvertent displacement.

The lens carriers 103 are not mounted directly on the slide 110 but on an intermediate slide 120 which is adjustable longitudinally on the slide 110. The slide 120 rests on the slide 110 and is slidably held thereon by edge clips 112. The slide 120 carries at its rear end an upstanding ear 124 and at front end the shield plate 130, heretofore mentioned, which carries the final objective lens 131. Mounted in aligned openings 125 and 133, in the ear 124 and the shield plate, is a horizontal rod shown in Fig. 5 as secured in position by screws 126 and 136. Mounted on this rod are hubs of the lens carriers 103. Each lens carrier is provided with a double hub extending at opposite directions therefrom, as indicated as 104 in Fig. 5. These elongated hubs form an accurate support for the lens carriers, holding them so that they lie in true vertical planes.

In front of the three lens carriers 103, shown in Fig. 5, is a shutter 140 having identical external contour to the lens carriers and similarly mounted, but being imperforate, whereby when in position it interrupts the projection of any image. The hubs of the different lens carriers and the shutter abut one and the other as shown in Fig. 5, and together fill the space between the front shield 130 and the rear supporting ear 124 in a supplemental slide 120.

The lens carriers when truly vertical are positioned with their lenses accurately in the line of projection. The lens 100 is shown in such position in Fig. 9. The shutter 140 may be similarly positioned. On the other hand, if the lens carriers or shutter are tipped outwardly they may be positioned out of the line of projection. The lens 101 is indicated in this position in Fig. 9.

The pivot line of each lens carrier is at one side of the center line so that when the lens carrier is vertical it remains by gravity in that position, its lower edge 107 resting on the top of the slide 120. On the other hand, when the lens carrier is tipped to the right side of the machine, which is usually the position where the attendant stands, the carrier remains in such tipped position by gravity.

To swing the lens carriers, I provide suitable finger knobs on their upper ends, shown as a pair of round buttons 109, and held on opposite sides of an ear at the upper end of their respective carriers by suitable bolts.

The above described formation of the lens carriers 103 and their operation into and out of position applies also to the shutter 140 which, as stated, has an external contour the same as the lens carrier, is similarly mounted, and is operated into and out of position by a similar top button 141.

The lens carriers are adjustable as a unit toward and from the transparency carrier by means of a screw 150 rotatably mounted in the shield plate 130 and having at its forward end a knurled operating knob 151. Toward its rear this screw is threaded in a clip 152 which is secured to the slide 110. Accordingly, this screw provides means for giving a fine adjustment to the position of the lenses for focal purposes, the slide 110 providing for a rough adjustment.

I have heretofore mentioned that my lantern has means for adjusting the front end thereof vertically to properly position the image on the screen in a vertical direction. The adjusting means shown in Figs. 4 and 8, comprises a pair of supporting wheels 160 mounted on a cross rod 161, which forms a knuckle of a pair of toggle plates 162 and 163. The plate 162 is fixedly hinged at 164 to the bottom of the frame 10. The plate 163 is pivoted at its forward end at 165 to a small slide 166, which is adjustably clamped to the base of the frame 10. The clamping is shown as effected by a handle nut 167 on a screw 168 which extends through a slot 169 in the base of the frame 10. By loosening a nut 167 by its handle the slide 166 may be shoved rearwardly to force the toggle knuckle downwardly, thus bringing the supporting wheels 160 into a lower position, as shown in Fig. 8. The effect of this is to raise the front end of the base to raise the image on the screen.

The base is usually provided on its underside with four rubber feet 170, which may support the entire apparatus on the horizontal top of a table, as indicated in Fig. 3. The feet hold the bottom of the base a sufficient distance above such table top that the toggle may be housed entirely in the idle space beneath the frame, as shown in Fig. 3. This space provides room for the operator's fingers to grasp the handle nut 167 to loosen it and shift the toggle.

It is very desirable to protect the film or the slides from excessive heat from the lamp 30. I accomplish this by providing a plate of heat absorbing and heat resisting glass 180 extending across the enlarged rear of the transparency carrying box while leaving an open space above and below the plate for ventilation, as shown in Fig. 4.

My selective lens system enables images of approximately uniform size to be projected on the screen from objects of widely different size on the slides or film, and the images may be portrayed in a very accurate and satisfactory manner. The selected lens or the combination thereof may be instantly changed as desired, and the interrupting shutter may be thrown across the line of projection whenever desired.

I claim:

1. In a projection lantern, the combination of a projection apparatus having a base provided with a lamp house and a transparency carrier, of a slide mounted on said base for movement in a direction parallel with the path of projected light, friction means carried by said slide and engaging said base and acting to retain said slide in an adjusted position, a supplemental slide mounted on said first named slide for movement relative thereto in a direction parallel with the path of projected light, an adjusting screw to adjust the relative position of said slides, a light shield mounted on said supplemental slide and having a lens positioned in the path of projected light, a lens carrier disposed between said shield and the projection apparatus, said carrier being movably mounted on said supplemental slide for movement from a position with its lens in the path of projected light, to a position where the lens and carrier is outside of the path of projected light, and an opaque member mounted on said supplemental slide intermediate said carrier and the said light shield, and pivoted to said supplemental slide for movement into and out of the path of projected light.

2. In a projection lantern, the combination of a projection apparatus having a base provided with a lamp house and a transparency carrier, of a slide mounted on said base for movement in a direction parallel with the path of projected light, a supplemental slide mounted on said first named slide for movement relative thereto in a direction parallel with the path of projected light, an adjusting screw rotatably mounted in one of said slides and in threaded engagement with the other slide to adjust the relative position of said slides, a light shield rigidly secured to said supplemental slide and having a lens positioned in the path of projected light, a plurality of supplemental lens carriers disposed between said shield and the projection apparatus, a rod mounted on said supplemental slide below and at one side of both the path of projected light and the center of gravities of said carriers, and wherein each of said supplemental carriers is pivotally mounted on said rod for individual swinging movement from a position with its lens in the path of projected light, to a position where such lens and carrier is outside of the path of projected light, and an opaque member mounted on said rod intermediate the supplemental carriers and said light shield and pivoted to said rod for movement into and out of the path of projected light.

CHARLES F. DUTTON.

REFERENCES CITED

The following references are of record in the file of this patent:

UNITED STATES PATENTS

| Number | Name | Date |
| --- | --- | --- |
| 724,197 | Marshutz | Mar. 31, 1903 |
| 1,032,798 | Zimmermann | July 16, 1912 |
| 1,176,691 | Ricker et al. | Mar. 21, 1916 |
| 1,204,425 | Gall | Nov. 14, 1916 |
| 1,229,159 | Singleton et al. | June 5, 1917 |
| 1,233,407 | Schwanhausser | July 17, 1917 |
| 1,620,338 | Frederick | Mar. 8, 1927 |
| 1,822,551 | Tondreau | Sept. 8, 1931 |
| 1,879,737 | Del Riccio | Sept. 27, 1932 |
| 2,009,145 | Nathan | July 23, 1935 |
| 2,059,361 | Kenworthy | Nov. 3, 1936 |
| 2,194,366 | Ott | Mar. 19, 1940 |
| 2,251,077 | Stanton | July 29, 1941 |
| 2,285,915 | Dutton | June 9, 1942 |

FOREIGN PATENTS

| Number | Country | Date |
| --- | --- | --- |
| 506,757 | Great Britain | June 5, 1939 |